United States Patent
Uehara

Patent Number: 5,806,647
Date of Patent: Sep. 15, 1998

[54] WEAR-COMPENSATING FRICTION CLUTCH

[75] Inventor: Hiroshi Uehara, Osaka, Japan

[73] Assignee: Exedy Corporation, Osaka, Japan

[21] Appl. No.: 832,286

[22] Filed: Apr. 3, 1997

[30] Foreign Application Priority Data

Apr. 4, 1996 [JP] Japan ................................ 8-108338

[51] Int. Cl.$^6$ ........................................... F16D 13/75
[52] U.S. Cl. ................................. 192/70.25; 192/89.23; 192/111 A
[58] Field of Search ........................... 192/70.25, 111 A, 192/70.27, 89.23

[56] References Cited

U.S. PATENT DOCUMENTS

| | | | |
|---|---|---|---|
| 5,409,091 | 4/1995 | Reik et al. | 192/70.25 |
| 5,450,934 | 9/1995 | Maucher | 192/70.25 |
| 5,586,633 | 12/1996 | Mizukami et al. | 192/70.25 |
| 5,706,924 | 1/1998 | Bacher | 192/111 A |
| 5,727,666 | 3/1998 | Maucher | 192/70.25 |

OTHER PUBLICATIONS

D.A. Davies, BSc; Paper 1. Friction Clutches and Clutch Control Mechanisms; Proc Instn Mech Engrs 1969–70; pp. 1–38; vol. 184 Pt 31.

Primary Examiner—Richard M. Lorence
Attorney, Agent, or Firm—Marshall & Melhorn

[57] ABSTRACT

A fulcrum slide ring and a wear-responsive adjust slide ring are coaxially disposed on a clutch cover, and are guided to move toward the clutch disk as they move circumferentially. A first biasing spring circumferentially urges the fulcrum slide ring relative to the clutch cover, and a second biasing spring circumferentially urges the fulcrum slide ring and the adjust slide ring relative to each other. The spring force of the second spring is smaller than that of the first biasing spring. A wear detecting resilient member permits an adjusting movement of the adjust slide ring which corresponds to the amount of wear of the clutch facing, and this in turn allows a corresponding adjusting movement of the fulcrum slide ring. Because the fulcrum point of the diaphragm spring is shifted by the alternating movement of the wear-responsive slide ring and the fulcrum slide ring which is aided by the wear detecting resilient member, a reliable and immediate adjust action can be accomplished.

4 Claims, 9 Drawing Sheets

WEAR-COMPENSATING FRICTION CLUTCH

TECHNICAL FIELD

The present invention relates to a friction clutch comprising a diaphragm spring for frictionally engaging a clutch facing with a pressure plate, and more particularly to a friction clutch which can maintain the clutch release load at a constant level without regard to the progress of the wear of the clutch facing.

BACKGROUND OF THE INVENTION

In a friction clutch, for instance for automotive use, a pressure plate for frictionally engaging a clutch facing is resiliently supported by a clutch cover so as to be urged away from the clutch facing when the clutch is disengaged, and the pressure plate is urged toward the clutch facing by a diaphragm spring when the clutch is engaged. In such a friction clutch, the pressure plate is normally pressed against the clutch facing by the spring force of the diaphragm spring, and the clutch may be disengaged by displacing the diaphragm spring so as to remove the spring force applied to the pressure plate and thereby moving the pressure plate away from the clutch facing.

In such a friction clutch, the operating point of the diaphragm spring for pressing the pressure plate shifts towards the clutch facing as the wear of the clutch facing progresses. This in turn causes the amount of deflection of the diaphragm spring to change as compared to the initial deflection at the time when the diaphragm was first installed. As a result, not only the pedal stroke required for releasing the clutch increases, but also the pedal force required to release the clutch increases due to the shifting of the operating point of the spring from an optimum point. As well known in the art, a diaphragm spring normally has a region of a negative spring constant, and the clutch release load is minimized by suitably selecting the operating point of the spring property. Therefore, a slight change in the operating point of the diaphragm spring can significantly affect the handling of the friction clutch. Such a change can substantially reduce the commercial acceptability of the clutch as it means an increased in the effort required to release the clutch. This problem can be resolved by keeping the relative distance between the pressure plate and the diaphragm spring constant.

Based on this recognition, various devices for automatically accommodating for the wear of the clutch facing have been proposed. Most of them perform their function by moving the fulcrum point of the diaphragm spring as the inclination angle of the diaphragm spring changes at the time the clutch is engaged and disengaged. However, the conventional proposals were highly complex in structure, and there have been some difficulties in building practical systems which are both economical and reliable.

BRIEF SUMMARY OF THE INVENTION

In view of such problems of the prior art, a primary object of the present invention is to provide a wear-compensating friction clutch which can maintain the clutch release load at a constant level without regard to the progress of the wear of the clutch facing.

A second object of the present invention is to provide a wear-compensating clutch which is economical to manufacture and reliable in use.

A-third object of the present invention is to provide a wear-compensating clutch which can compensate for the wear of the clutch facing over a large wear stroke.

According to the present invention, these and other objects can be accomplished by providing a friction clutch, comprising: a diaphragm spring consisting of an annular dish spring which resiliently urges a pressure plate into engagement with a clutch facing when the clutch is engaged, the pressure plate being connected to a clutch cover and resiliently urged away from the clutch facing; a fulcrum slide ring having an abutting portion for engaging a fulcrum point defined in a radially intermediate part of the diaphragm spring, and circumferentially slidably guided by the clutch cover so as to move the abutting portion toward the clutch facing according to a circumferential sliding motion of the fulcrum slide ring; a wear detecting resilient member having first and second engagement pieces engaged by the clutch cover and the pressure plate, respectively, the wear detecting resilient member being deformable according to a progress of wear of the clutch facing; a first biasing spring provided between the fulcrum slide ring and the clutch cover to resiliently urge the fulcrum slide ring circumferentially and to thereby move the abutting portion toward the clutch facing; a wear-responsive slide ring coaxially and circumferentially slidably disposed with respect to the fulcrum slide ring, and adapted to engage the wear detecting resilient member as the wear-responsive slide ring slides circumferentially; and a second biasing spring interposed between the fulcrum slide ring and the wear-responsive slide ring to resiliently urge the wear-responsive slide ring in a circumferential direction with a spring force which is smaller than a spring force of the first biasing spring to move the wear-responsive slide ring until the wear-responsive slide ring abuts a first abutting piece formed in the wear detecting resilient member; wherein a second abutting piece is integrally formed with the wear detecting resilient member, the second abutting piece opposing the abutting portion of the fulcrum slide ring so as to support a fulcrum point of the diaphragm spring for a pivotal movement thereof at the time of a clutch release operation and being provided with a sufficient rigidity to withstand a release load of the diaphragm spring.

Because the fulcrum point of the diaphragm spring is shifted by the alternating movement of the wear-responsive slide ring and the fulcrum slide ring which is aided by the wear detecting resilient member, a reliable and immediate adjust action can be accomplished.

According to a preferred embodiment of the present invention, the fulcrum slide ring and the wear responsive slide ring are coaxially disposed on the clutch cover one radially next to the other, and the second biasing spring comprises a compression coil spring which is placed in a slot jointly defined by recesses formed in the two rings so as to circumferentially bias the two rings relative to each other.

The wear detecting resilient member may comprise an annular main body, the first engagement piece extending from an inner periphery of the main body and engaged by the clutch cover, and the second engagement piece, and the first and second abutting pieces extending from an outer periphery of the main body. Preferably, the fulcrum slide ring is provided with an arm extending radially from an outer periphery thereof, and the first biasing spring comprises a compression coil spring interposed between the arm and a part of the clutch cover.

BRIEF DESCRIPTION OF THE DRAWINGS

Now the present invention is described in the following with reference to the appended drawings, in which:

FIG. 5(*b*) is a fragmentary view as seen from arrow Vb of FIG. 5(*a*);

FIG. 6(*b*) is a fragmentary view as seen from arrow VIb of FIG. 6(*a*);

FIG. 7(*b*) is a fragmentary view as seen from arrow VIIb of FIG. 7(*a*);

FIG. 8(*b*) is a fragmentary view as seen from arrow VIIIb of FIG. 8(*a*);

FIG. 9(*b*) is a fragmentary view as seen from arrow IXb of FIG. 9(*a*);

FIG. 10(*b*) is a fragmentary view as seen from arrow Xb of FIG. 10(*a*).

DETAILED DESCRIPTION OF THE PREFERRED EMBODIMENTS

Figure 1:
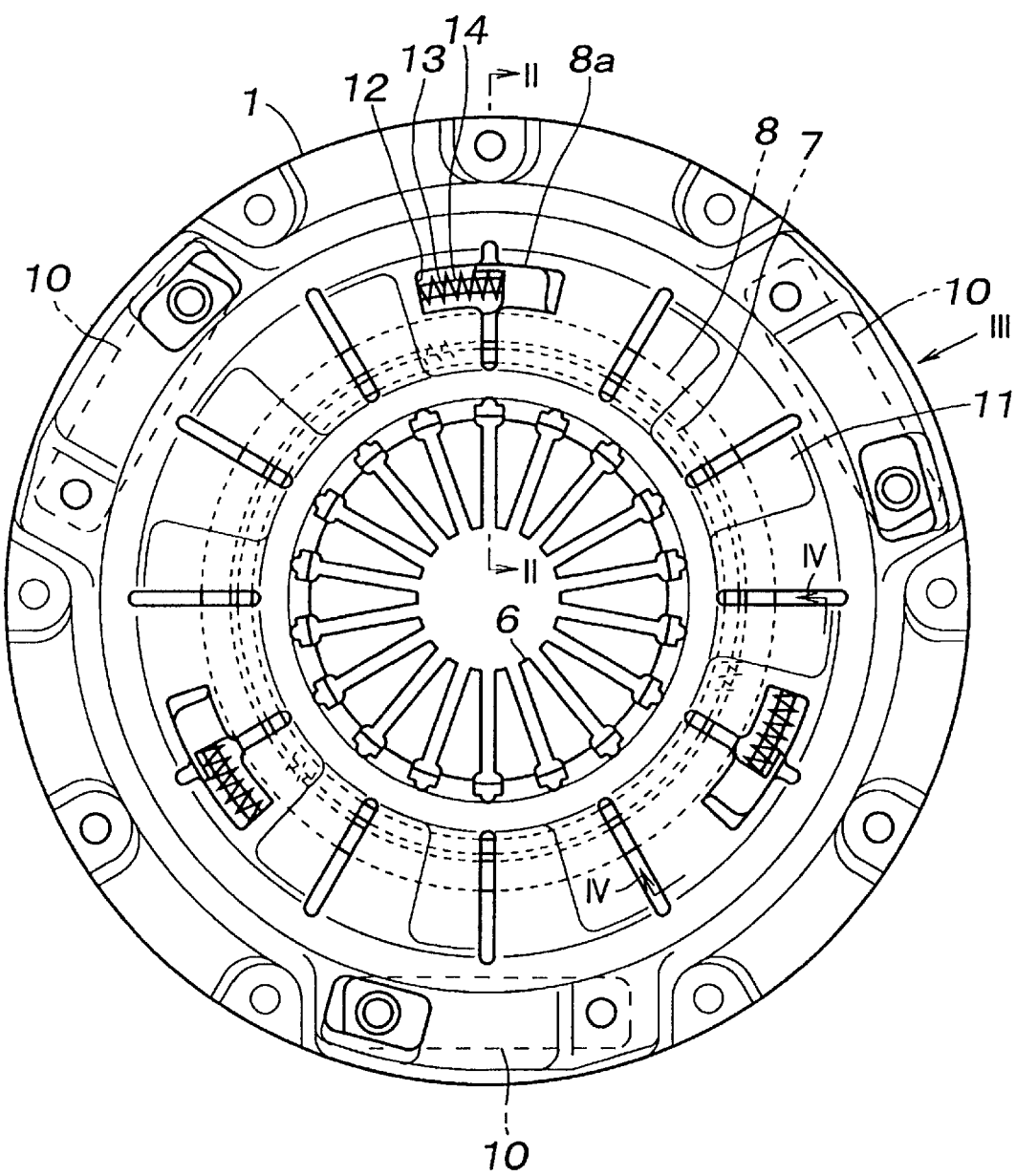
FIG. 1 is an overall front view generally illustrating the clutch cover of the friction clutch to which the present invention is applied.
Figure 2:
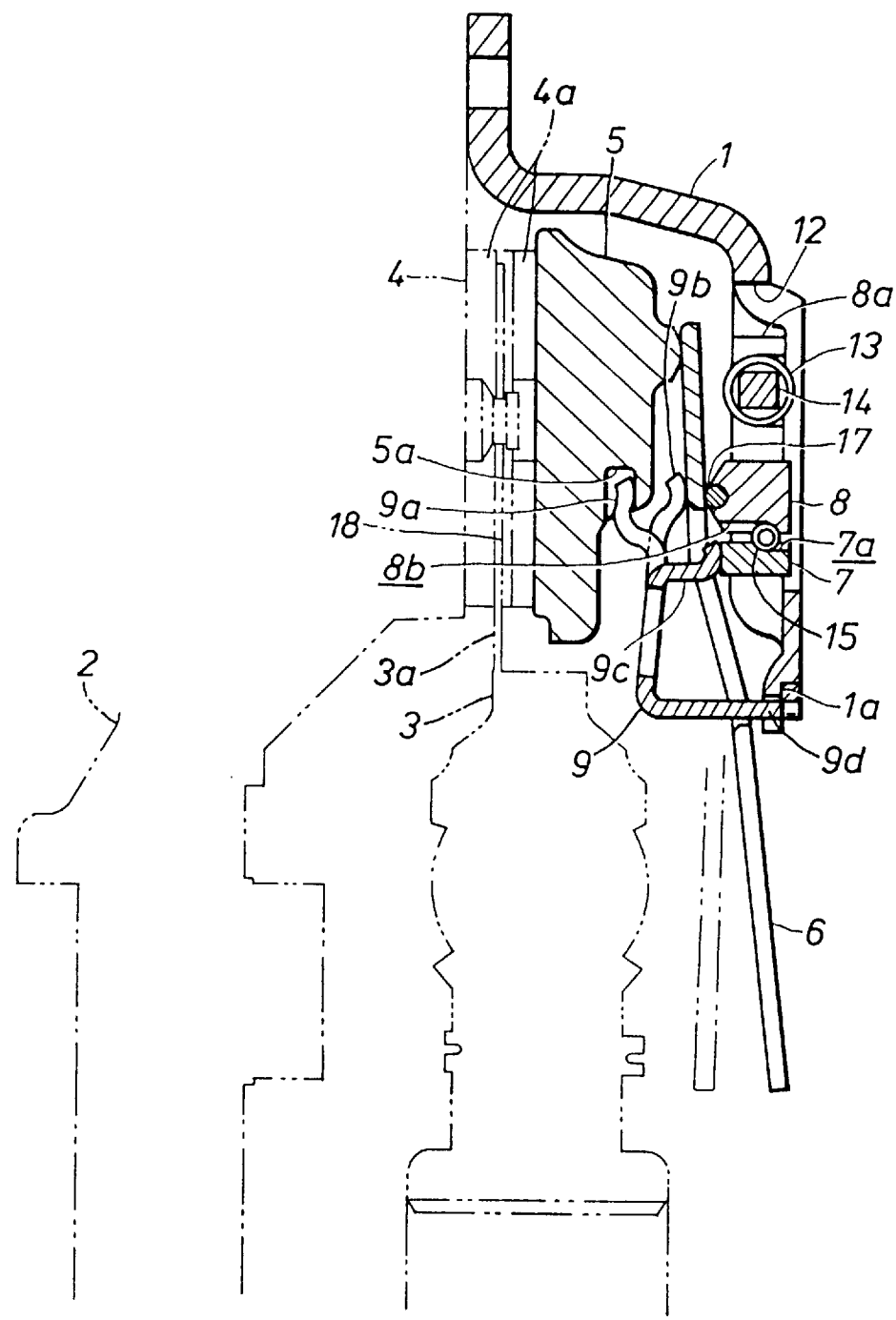
FIG. 2 is an enlarged sectional view showing an essential part of FIG. 1 taken along line II—II of FIG. 1.

FIG. 1 is an overall front view generally illustrating the clutch cover 1 of a friction clutch to which the present invention is applied, and FIG. 2 is a sectional side view of an essential part taken along line II—II of FIG. 1. As shown in the drawings, the clutch cover 1 is fixedly secured to an input end of a flywheel 2, and a gap defined between the two parts accommodates a clutch disk 3, an annular pressure plate 5 for pressing the clutch facing 4 against the flywheel 2 from both sides of the clutch disk 3, and a diaphragm spring 6 for resiliently urging the pressure plate 5.

The diaphragm spring 6 consists of an annular sheet spring member having a plurality of slots extending radially at equal angular interval from an inner circumference thereof. A fulcrum slide ring 8 is mounted to the clutch cover 1 so as to be circumferentially slidable, and is placed in such a position as to correspond to a radially intermediate point of the diaphragm spring 6 serving as a fulcrum point therefor. An adjust ring 7, serving as a wear-responsive slide ring, is disposed concentrically to and along the inner circumference of the fulcrum slide ring 8.

The inner periphery of the diaphragm spring 6 is adapted to be engaged by a release bearing which is not shown in the drawing, and the pressure plate 5 is resiliently urged by the outer periphery of the diaphragm spring 6 in the initially installed state or when the clutch is engaged.

The inner periphery of the clutch cover 1 defining a circular central opening is provided with a plurality of stepped portions 1a which engage a first engagement piece 9d defined by an inner periphery of a support ring 9 which serves as a wear detecting resilient member and has a substantially L-shaped cross section. A plurality of second engagement pieces 9a formed by bending tongue pieces integrally extending from the support ring 9 along the outer periphery of the support ring 9 are engaged by engagement recesses 5a formed in the pressure plate 5 to thereby join the support ring 9 and the pressure plate 5 together.

When the clutch is engaged, the pressure plate 5 is urged toward the flywheel 2 by the diaphragm spring 6. In this state, the support ring 9 is engaged, by virtue of its resiliency, by both the clutch cover 1 and the pressure plate 5 along its inner and outer peripheries. In other words, the spring force of the support ring 9 is smaller than that of the diaphragm spring 6 which it demonstrates when the clutch is engaged. To the part of the fulcrum slide ring 8 which abuts the diaphragm spring 6 is attached an annular fulcrum core member 17 which serves as a fulcrum point for the pivotal movement of the diaphragm spring 6.

The outer periphery of the support ring 9 is provided with, in addition to the aforementioned second engagement pieces 9a, a plurality of first abutting pieces 9c for engaging the side of the adjust ring 7 facing the clutch facing 4, and a plurality of second abutting pieces 9b for abutting the part of the diaphragm spring 6 located right on the other side of the fulcrum core member 17, by bending tongue pieces extending integrally from the support ring 9 in both cases.

Figure 3:
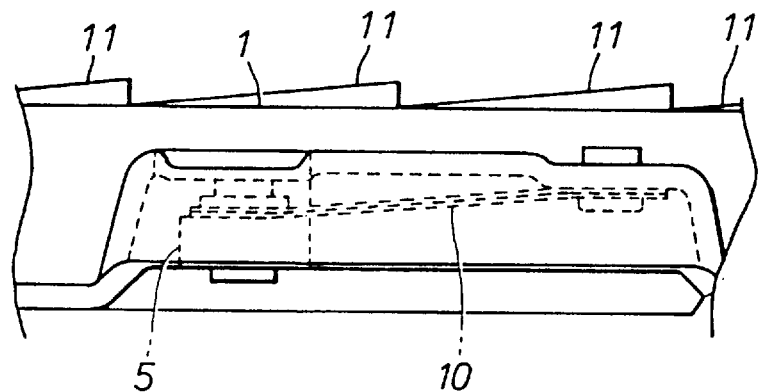
FIG. 3 is an enlarged sectional view showing an essential part of FIG. 1 as seen from arrow III of FIG. 1.

Referring to FIG. 1, the pressure plate 5 is supported by the clutch cover 1 via cushion springs 10 (FIG. 3) which are arranged tangentially at three locations along the outer circumference of the pressure plate 5 so as to resiliently urge the pressure plate 5 away from the clutch facing 4. When the clutch is actuated, the release bearing moves axially to pivot the diaphragm spring 6 around the fulcrum core member 17 as indicated by the imaginary lines in FIG. 2 so that the pressure on the outer periphery of the pressure plate 5 is relieved and the clutch disk 3 is disengaged from the flywheel 2. The clutch is thus disengaged.

Figure 4:
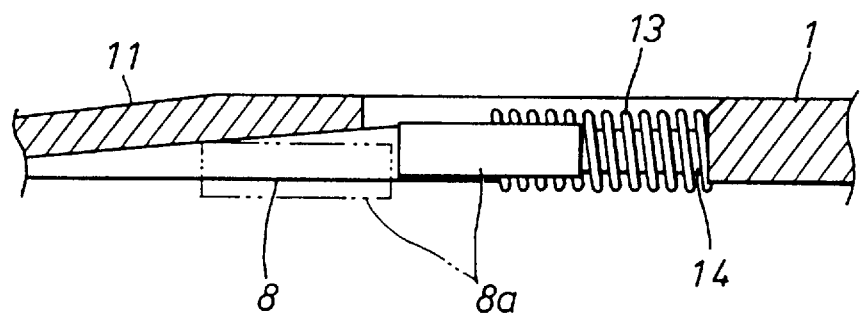
FIG. 4 is an enlarged sectional view showing an essential part of FIG. 1 taken along line IV—IV of FIG. 1.

The end plate of the clutch cover 1 extending perpendicularly to the axial line of the clutch cover 1 is formed with a plurality of circumferentially inclined guide surfaces 11 by raising the material of the clutch cover 1, at equal angular interval. The guide surfaces 11 are formed as illustrated in FIG. 4 showing a part of the fulcrum slide ring 8 in an enlarged scale, and moves the fulcrum slide ring 8 and the adjust ring 7 toward the clutch facing 4 as they slide circumferentially on the inclined guide surfaces 11.

The outer periphery of the fulcrum slide ring 8 is integrally provided with three radially extending arms 8a as illustrated in FIG. 1. The clutch over 1 is provided with openings 12 for accommodating the arms 8a at corresponding positions, and a first biasing spring 13, consisting of a compression coil spring, is interposed between each of the arms 8a and the opposing circumferential edge of the corresponding opening 12 so as to urge the fulcrum slide ring 8 in the circumferential direction. The first biasing springs 13 each coaxially surround a slightly curved rod 14 which extends circumferentially into the corresponding opening 12 from the corresponding edge of the opening.

Figure 5A:
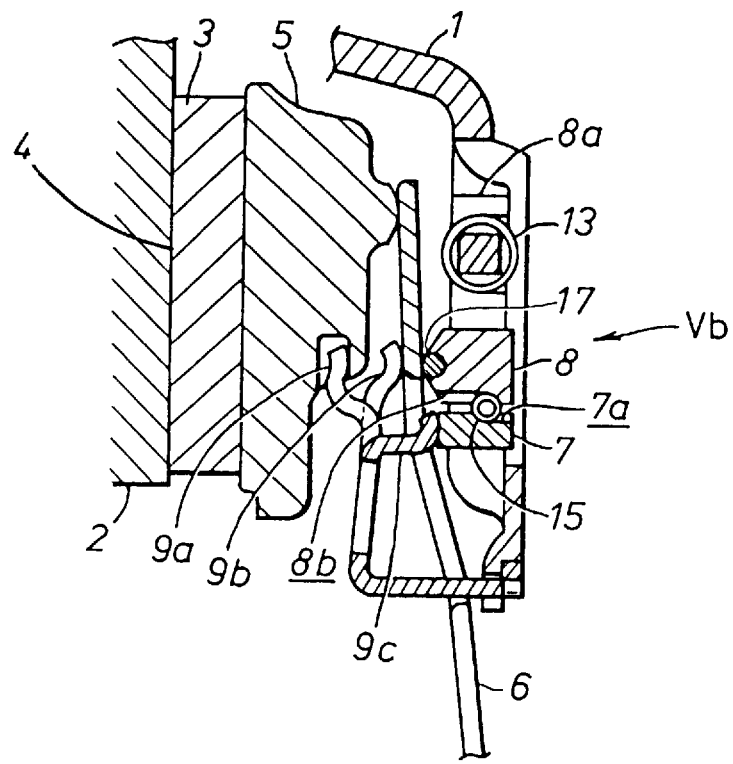
FIG. 5(*a*) is a sectional view of an essential part similar to FIG. 2 showing the mode of operation of the friction clutch to which the present invention is applied.
Figure 5B:
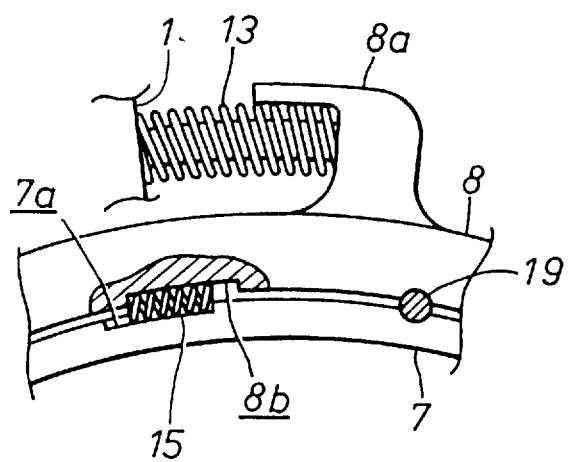
Figure 6A:
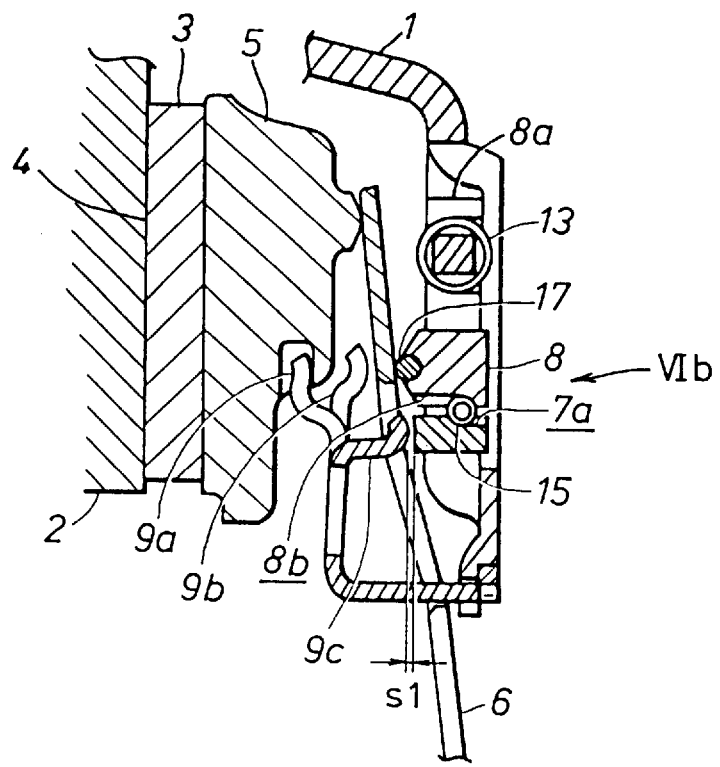
FIG. 6(*a*) is a view similar to FIG. 5 showing the mode of operation of the friction clutch to which the present invention is applied.
Figure 6B:
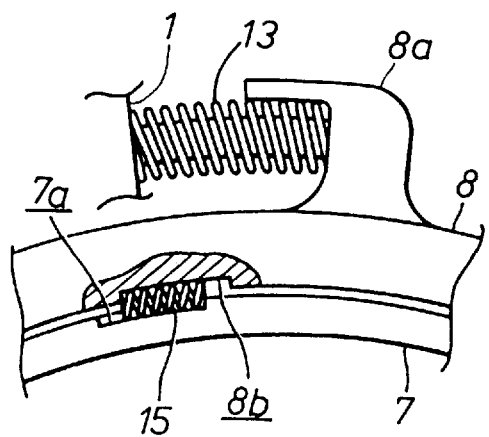

Referring to FIG. 5(*a*), a plurality of second biasing springs 15 are placed circumferentially between the two rings 7 and 8, or more specifically between the inner circumferential surface of the fulcrum slide ring 8 and the outer circumferential surface of the adjust ring 7. As best illustrated in FIG. 5(b), each of the second biasing springs 15 is received in a slot jointly defined by recesses 7a and 8b formed in the two rings 7 and 8, respectively, with its axial ends supported therein, and with a certain pre-compression given thereto.

As shown in FIG. 5(b), in the initial state, the corresponding two recesses 7a and 8b of an identical length are circumferentially offset by a prescribed length, and this offset causes a compression to the second biasing spring 15. The spring force of the second biasing springs 15 which are thus pre-compressed tends to cause the adjust ring 7 to slide in the circumferential direction, but this movement is prevented by the frictional resistance existing between the adjust ring 7 and the first abutting pieces 9c of the support ring 9.

Each of the recesses 7a of the adjust ring 7 extends from the outer circumferential surface of the adjust ring 7 facing away from the pressure plate 5 to an intermediate part of the adjust ring 7 while the corresponding recess 8a of the fulcrum slide ring 8 extends from the inner circumferential surface of the slide ring 8 facing the pressure plate 5 to an intermediate part of the slide ring 8. Therefore, the fulcrum slide ring 8 is restricted from protruding toward the pressure plate 5 by the adjust ring 7.

Because the second biasing springs 15 are installed in their pre-compressed initial state, a pin 19 is passed through an opening provided in the clutch cover 1 into recesses provided in the two rings so that the relative position of the two rings 7 and 8 may be maintained in the state illustrated in FIG. 5 during assembly and transportation. Once the clutch is installed in the vehicle, even when the pin 19 is removed, because the clutch disk 3 is engaged by a drive shaft via a spline coupling, the relative position between the two rings 7 and 8 are maintained in the initial state.

The clutch disk 3 is formed by interposing a steel disk 3a between a pair of planar facing members 4a, and a wave spring 18 is interposed between the two planar facing members for improving the performance thereof at the time of partial engagement.

The operation of the friction clutch having the above described structure is described in the following with reference to FIGS. 5 to 10. FIG. 5 shows the stable state of the facing 4 when it is still free from wear, and the diaphragm spring 6 abuts the fulcrum core member 17 of the fulcrum slide ring 8 in this state.

As the wear of the facing 4 progresses, the pressure plate 5 moves toward the flywheel 2 by a corresponding distance. As a result, the support ring 9 engaged by the pressure plate 5 via the second engagement pieces 9a is deflected, and it creates a gap S1 between the second abutting pieces 9c and the adjust ring 7.

Figure 7A:
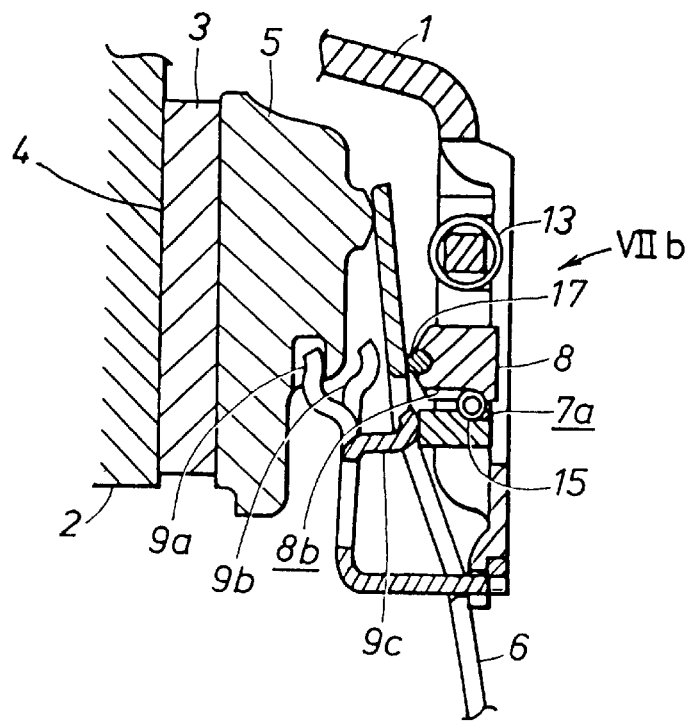
FIG. 7 (*a*) is a view similar to FIG. 5 showing the mode of operation of the friction clutch to which the present invention is applied.
Figure 7B:
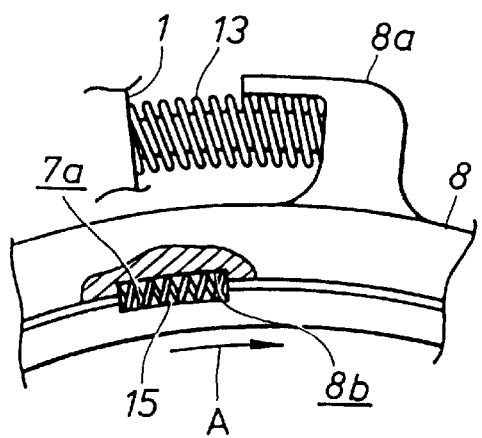

This in turn causes the aforementioned frictional resistance to be reduced so that the spring force of the second biasing springs 15 slides the adjust ring 7 circumferentially as indicated by arrow A in FIG. 7(b). This sliding movement causes the adjust ring 7 to be guided by the inclined guide surfaces 11 toward the facing 4 until the first abutting pieces 9c abut the adjust ring 7 to fill the gap S1 as shown in FIG. 7(a). Because the two recesses 7a and 8b are given with an identical circumferential length as mentioned earlier, this sliding movement can continue until the two recesses 7a and 8b align with each other.

Figure 8A:
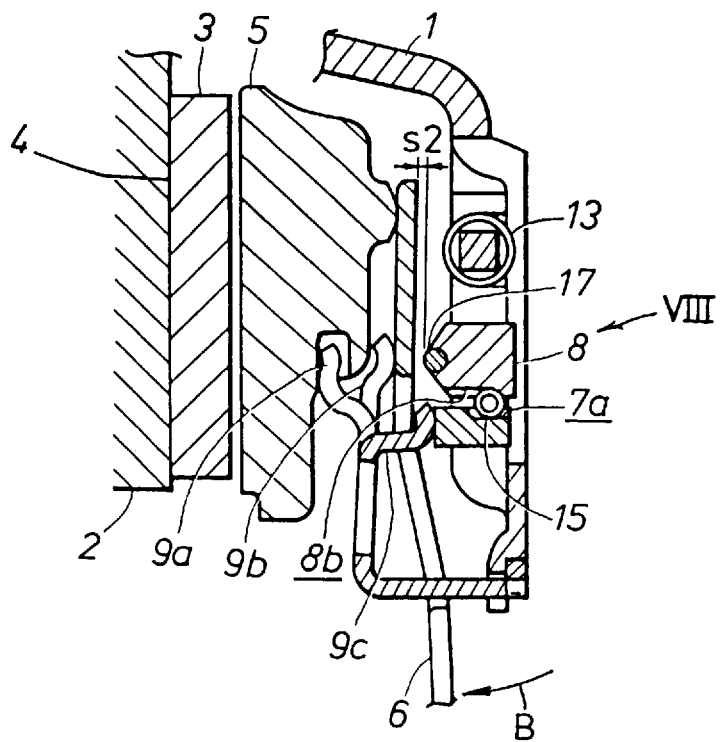
FIG. 8 (*a*) is a view similar to FIG. 5 showing the mode of operation of the friction clutch to which the present invention is applied.
Figure 8B:
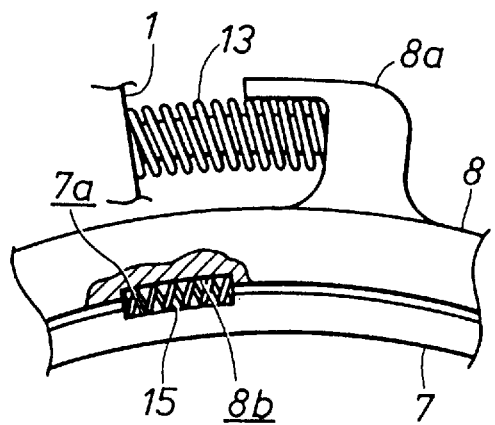

When the clutch is disengaged in this state, the diaphragm spring 6 pivots as shown by arrow B in FIG. 8(a). During this clutch release operation, the second abutting pieces 9b for clutch release action serves as a fulcrum point for the diaphragm spring 6. This clutch releasing operation causes a gap S2 between the fulcrum core member 17 of the fulcrum slide ring 8 and the diaphragm spring 6 as shown in FIG. 8(a), and the frictional resistance between the fulcrum slide ring 8 and the diaphragm spring 6 is relieved.

Figure 9A:
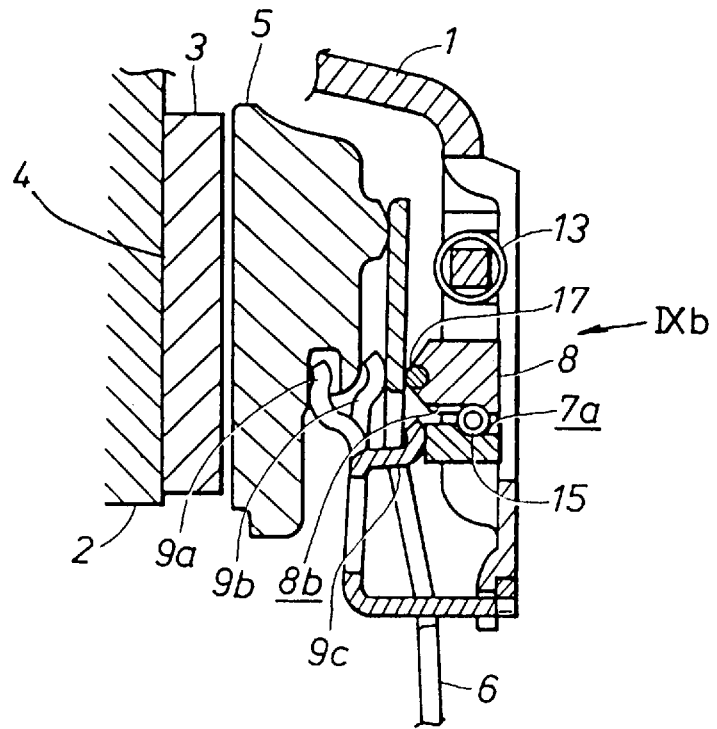
FIG. 9 (*a*) is a view similar to FIG. 5 showing the mode of operation of the friction clutch to which the present invention is applied.
Figure 9B:
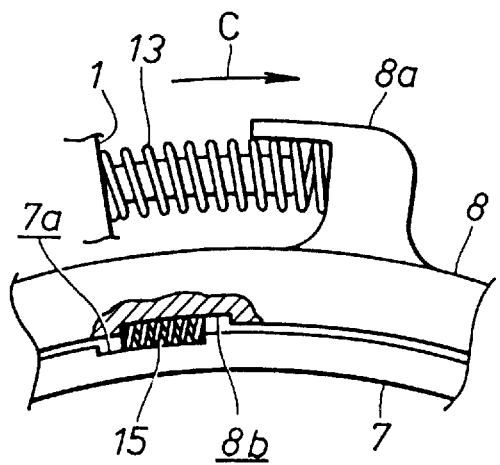

This in turn causes the fulcrum slide ring 8 to be resiliently urged by the first biasing springs 13 and to be moved in the circumferential direction as shown by arrow C in FIG. 9(b) until the gap S2 is filled. At this time, because the spring force of the second biasing springs 15 is substantially smaller than that of the first biasing springs 13, the second biasing springs 15 are again compressed into the state shown in FIG. 9(b). Because the relative position between the first abutting pieces 9c and the second abutting pieces 9b for clutch release operation is fixed, the relative axial protrubances of the adjust ring 7 and the fulcrum slide ring 8 can be made equal to their original values.

Figure 10A:
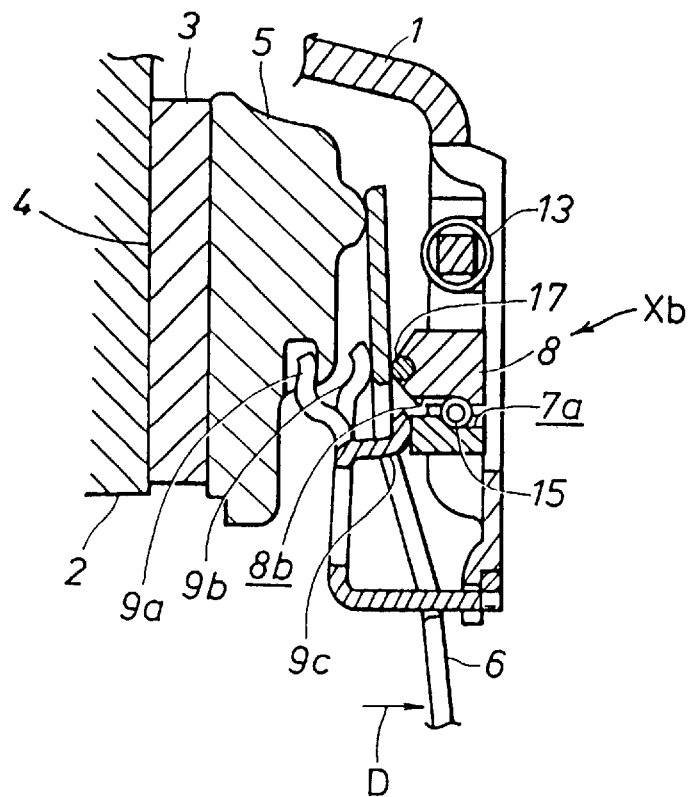
FIG. 10 (*a*) is a view similar to FIG. 5 showing the mode of operation of the friction clutch to which the present invention is applied.
Figure 10B:
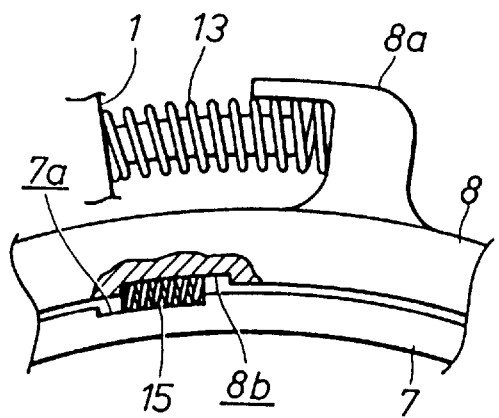

When the clutch is engaged again, the diaphragm spring 6 pivots in the opposite direction from that when the clutch is released as indicated by arrow D in FIG. 10(a), and the state illustrated in FIG. 5 is restored. In the state illustrated in FIG. 10, the two rings 7 and 8 have already displaced by a distance corresponding to the wear of the clutch facing as described above, and the relative position between the pressure plate 5 and the two rings 7 and 8 is maintained same as the initial state.

A large wear was compensated for in the above description, but the gaps S1 and S2 were exaggerated for illustration purpose, and the actual compensation action occurs as soon as a small wear is produced. Because the adjust ring can follow even an extremely small wear, the wear is compensated for as soon as it is produced.

Thus, according to the present invention, a fulcrum slide ring and a wear-responsive adjust slide ring are coaxially disposed on a clutch cover, and are guided to move toward the clutch disk as they move circumferentially. A first biasing spring circumferentially urges the fulcrum slide ring relative to the clutch cover, and a second biasing spring circumferentially urges the fulcrum slide ring and the adjust slide ring relative to each other. The spring force of the second spring is smaller than that of the first biasing spring. A wear detecting resilient member permits an adjusting movement of the adjust slide ring which corresponds to the amount of wear of the clutch facing, and this in turn allows a corresponding adjusting movement of the fulcrum slide ring. Because the fulcrum point of the diaphragm spring is shifted by the alternating movement of the wear-responsive slide ring and the fulcrum slide ring which is aided by the wear detecting resilient member, a reliable and immediate adjust action can be accomplished.

According to the present invention, although the structure is highly simple, the release load can be maintained at a constant level and the wear of the clutch facing is compensated for in both economical and reliable manner. Because the wear of the clutch facing can be directly detected, an immediate wear compensation can be achieved. Also, a relatively large stroke of wear can be compensated for according to the present invention, and a favorable wear compensation can be carried out throughout the entire service life of the clutch facing.

Although the present invention has been described in terms of preferred embodiments thereof, it is obvious to a person skilled in the art that various alterations and modifications are possible without departing from the scope of the present invention which is set forth in the appended claims.

What we claim is:

1. A friction clutch, comprising:

a diaphragm spring consisting of an annular dish spring which resiliently urges a pressure plate into engagement with a clutch facing when the clutch is engaged, said pressure plate being connected to a clutch cover and resiliently urged away from said clutch facing;

a fulcrum slide ring having an abutting portion for engaging a fulcrum point defined in a radially intermediate part of said diaphragm spring, and circumferentially slidably guided by said clutch cover so as to move said abutting portion toward said clutch facing according to a circumferential sliding motion of said fulcrum slide ring;

a wear detecting resilient member having first and second engagement pieces engaged by said clutch cover and said pressure plate, respectively, said wear detecting resilient member being deformable according to a progress of wear of said clutch facing;

a first biasing spring provided between said fulcrum slide ring and said clutch cover to resiliently urge said fulcrum slide ring circumferentially and to thereby move said abutting portion toward said clutch facing;

a wear-responsive slide ring coaxially and circumferentially slidably disposed with respect to said fulcrum slide ring, and adapted to engage said wear detecting resilient member as said wear-responsive slide ring slides circumferentially; and a second biasing spring interposed between said fulcrum slide ring and said wear-responsive slide ring to resiliently urge said wear-responsive slide ring in a circumferential direction with a spring force which is smaller than a spring force of said first biasing spring to move said wear-responsive slide ring until said wear-responsive slide ring abuts a first abutting piece formed in said wear detecting resilient member;

wherein a second abutting piece is integrally formed with said wear detecting resilient member, said second abutting piece opposing said abutting portion of said fulcrum slide ring so as to support a fulcrum point of said diaphragm spring for a pivotal movement thereof at the time of a clutch release operation and being provided with a sufficient rigidity to withstand a release load of said diaphragm spring.

2. A friction clutch according to claim 1, wherein said fulcrum slide ring and said wear responsive slide ring are coaxially disposed on said clutch cover one radially next to the other, and said second biasing spring comprises a compression coil spring which is placed in a slot jointly defined by recesses formed in said two rings so as to circumferentially bias said two rings relative to each other.

3. A friction clutch according to claim 1, wherein said wear detecting resilient member comprises an annular main body, said first engagement piece extending from an inner periphery of said main body and engaged by said clutch cover, and said second engagement piece, and said first and second abutting pieces extending from an outer periphery of said main body.

4. A friction clutch according to claim 1, wherein said fulcrum slide ring is provided with an arm extending radially from an outer periphery thereof, and said first biasing spring comprises a compression coil spring interposed between said arm and a part of said clutch cover.

* * * * *